No. 789,978. PATENTED MAY 16, 1905.
I. KITSEE.
TREATMENT OF COTTON SEED.
APPLICATION FILED JAN. 16, 1905.
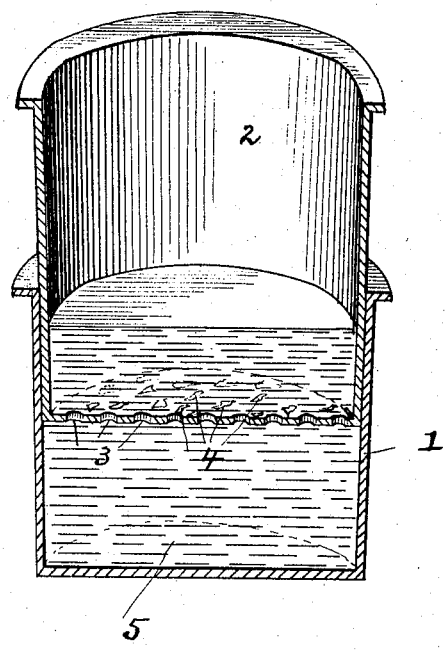

No. 789,978.                                    Patented May 16, 1905.

UNITED STATES PATENT OFFICE.

ISIDOR KITSEE, OF PHILADELPHIA, PENNSYLVANIA.

TREATMENT OF COTTON-SEED.

SPECIFICATION forming part of Letters Patent No. 789,978, dated May 16, 1905.

Application filed January 16, 1905. Serial No. 241,318.

*To all whom it may concern:*

Be it known that I, ISIDOR KITSEE, of the city and county of Philadelphia, State of Pennsylvania, have invented certain new and useful Improvements in the Treatment of Cotton-Seed, (Case No. 232,) of which the following is a specification.

My invention relates to an improvement in the treatment of cotton-seed.

As is well known, cotton-seed now used principally for the production of the so-called "cotton-seed oil" is subjected to one of the following processes for the purpose of extracting the oil. One process is to first destroy the short hairs or fuzz left on the hull of the seed after the ginning process and then to extract the oil through mechanical means. The second process is to first crush the seed to a fine powder and then through mechanical means sift the fuzz out of the crushed particles, whereby such fuzz may be used in the manufacture of articles, such as paper of a very low grade. Both processes have their disadvantages; and it is the aim of my invention to improve upon said processes and to produce a useful article out of the fuzz without necessitating the breaking up of the seed.

Persons versed in the art are aware that the pure cotton fiber is one of the best materials for the production of a soluble cellulose, either through nitrating or through similar means.

In application filed September 17, 1904, under Serial No. 224,832, I have described a process whereby the whole seed—that is, the hull with its inclosed kernel and the fuzz on said hull—is subjected to certain processes whereby the fuzz is made soluble, then dissolved, and then removed.

In some cases, especially where the nitrating has to be carried out to the highest degree, so as to make a tetra product useful for smokeless powder or other explosive materials, or where for one reason or other the seed with its dissolved fiber has to remain for a greater length of time in the solvent it may happen that the kernel, especially if the hull is not entirely intact, may be injured, and in such cases it would be preferable that the kernel is removed from the hull before the nitrating or dissolving processes are carried out, and this my invention has for its object to treat the cotton-seed in a manner so that the hull with its fuzz alone is subjected to the process, as hereinafter enumerated.

In practicing my invention I preferably employ the following steps: I first break up the hull and remove the kernel therefrom, and I then subject the hull with its covering of fuzz to the process of nitration for a length of time, so that the short fibers of cotton are nitrated to the required extent and the hull proper may remain substantially in the unnitrated state. After the necessary washing I subject the particles of hull, with the nitrated fiber, to the action of a solvent either in the liquid or gaseous state, whereby the nitrated fiber is dissolved, but the unnitrated hull remains intact. If the dissolving process is carried out in the liquid state, the broken-up pieces of hull are entirely freed from the fiber and can then be used either for fertilizing purposes or can then be intermixed with the material remaining from the kernel after the oil is pressed out. If the solvent is used in gaseous state, then it is best to free the pieces of hull by mechanical means from the dissolved cellulose. In my experiments, in which I used broken-up pieces of hull, the kernels removed therefrom, I subjected these broken-up pieces, with the adherent fuzz, to the nitrating process in a solution consisting of nitric acid one part and sulfuric acid two parts. They were left in this solution for about five to six minutes, were taken out of this solution after this time, were washed in running water, and were then subjected to the action of acetone. The broken-up pieces of hull, which were formerly covered with more or less fuzz, were taken out of the acetone in their naked state and entirely free from all fiber.

The advantages of this process over and above the process as described in the application above mentioned consist therein that the nitration may be carried to a point where even the hull is attacked without detrimental effect on the dissolved cellulose later on to be obtained. The only effect on the dissolving of part of the hull is that the solution of the dissolved cellulose is not as pure and clear as when the hull is not present.

To enable persons to practice this my invention, even on a small scale, I illustrate in plan view the preferred apparatus for making soluble the adherent fiber on the seed, but it is obvious that other devices may be substituted therefor.

In the figure, 1 is a containing vessel containing the liquid 5. 2 is a vessel the bottom of which is provided with the perforations 3. On this bottom are placed the broken-up hulls 4 to be treated.

The *modus operandi* of practicing this my invention with the apparatus illustrated is as follows: The broken-up hulls with the fuzz thereon are placed, as stated, at the bottom of the vessel 2. Then this vessel is slowly immersed in the containing vessel 1. Through the perforations 3 the liquid will rise in the vessel 2, covering thereby the broken-up hulls, which will be subjected to the action of such liquid, and if this liquid consists of nitric and sulfuric acids it is obvious that the fiber on the seeds will be subjected to the nitrating action of this liquid, and therefore becomes soluble. After a predetermined time the vessel 2 is removed from the vessel 1, and the hulls which will remain in the vessel 2 are washed and then subjected to the action of a solvent. This solvent may also be contained in a vessel similar to vessel 1, and then the vessel 2 with its seeds may be immersed in the solvent contained in such vessel.

As the dissolving of a soluble fiber is well understood by persons versed in the art, I do not deem it necessary to go more into the detail of same. It suffices to say that if it is desired the dissolving step may be made to follow immediately after the nitrating step, or the nitrated fiber may be allowed to remain on the hulls till such time as it is desired to remove the same therefrom through the dissolving process.

Having now described my invention, what I claim as new, and desire to secure by Letters Patent, is—

1. The method of treating cotton-seed which consists in first subjecting the seed to a process whereby the hull is broken up, then to a process whereby the kernel is removed from said hull, then subjecting the broken-up hull with its adherent fiber to a chemical action whereby the fiber is made soluble, and afterward subjecting said hull with said adherent fiber to a chemical action whereby said fiber is dissolved.

2. In the treatment of the hulls of cotton-seed, the method which consists therein that the hulls of said seeds are first broken up and the kernel removed therefrom, and are then with their adherent fibers subjected to a process whereby the fibers are nitrated, then to a process whereby the nitrated fibers are dissolved, and finally to a process whereby the dissolved fibers are removed from the hulls.

In testimony whereof I hereby sign my name, in the presence of two subscribing witnesses, this 14th day of January, A. D. 1905.

ISIDOR KITSEE.

Witnesses:
 EDITH R. STILLEY,
 H. C. YETTER.